United States Patent [19]

Bristowe et al.

[11] 4,213,837

[45] Jul. 22, 1980

[54] VINYL ESTER URETHANES

[75] Inventors: William W. Bristowe, Wilmington; Ernest C. Ford, Jr., Newark, both of Del.; Weldon N. Reed, Avondale, Pa.

[73] Assignee: ICI Americas Inc., Wilmington, Del.

[21] Appl. No.: 852,625

[22] Filed: Nov. 18, 1977

[51] Int. Cl.$^2$ .................... C08F 283/02; C08F 283/06
[52] U.S. Cl. ............................ 204/159.19; 525/440; 525/455; 525/920
[58] Field of Search .................... 260/859, 859 R; 525/440, 455, 920; 204/159.19

[56] References Cited

U.S. PATENT DOCUMENTS

| | | | |
|---|---|---|---|
| 3,509,234 | 4/1970 | Burlant | 260/859 R |
| 3,641,199 | 2/1972 | Niederhauser | 260/859 R |
| 3,677,920 | 7/1972 | Kai | 260/859 R |
| 3,678,014 | 7/1972 | Suzuki | 260/859 R |
| 3,772,404 | 11/1973 | Knight | 260/859 R |
| 3,876,726 | 4/1975 | Ford | 260/859 R |
| 3,907,751 | 9/1975 | Knight | 260/859 R |
| 3,925,335 | 12/1975 | Kuehn | 260/859 R |
| 3,929,929 | 12/1975 | Kuehn | 260/859 R |
| 3,954,714 | 5/1976 | Kuehn | 260/859 R |
| 3,975,457 | 8/1976 | Chang | 260/859 R |
| 4,034,017 | 7/1977 | Chang | 260/859 R |
| 4,052,282 | 10/1977 | Kubushiro | 260/859 R |

FOREIGN PATENT DOCUMENTS 2120399 11/1971 Fed. Rep. of Germany ...... 260/859 R

Primary Examiner—Paul Lieberman
Attorney, Agent, or Firm—H. Jolyon Lammers

[57] ABSTRACT

Vinyl ester urethane resins prepared by reacting (a) the reaction product of a polyoxyalkylene bisphenol A and a polycarboxylic acid or anhydride, (b) a polyfunctional isocyanate, and (c) a monohydroxyl-terminated ester of acrylic acid are useful in coating compositions.

32 Claims, No Drawings

VINYL ESTER URETHANES

BACKGROUND OF THE INVENTION

1. Field of the Invention

The present invention relates generally to vinyl ester urethane resins, to methods of preparing said resins, and to compositions containing said resins. More particularly, the invention relates to vinyl ester urethane resins having the following general formula:

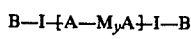

wherein

A is a radical derived from a polyoxyalkylene bisphenol A having the the following formula:

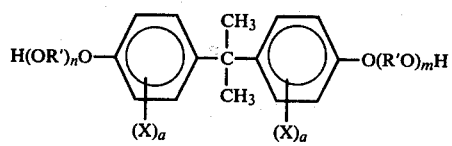

wherein

R' is $C_1$–$C_4$ alkylene group,

X is halogen a is an integer equal to from 0 to 2, and m and n are integers each of which is equal to at least 1 and the sum of which is equal to from about 9 to about 30;

M is a radical derived from (A) an unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixtures of A, B, or C;

I is a radical derived from a polyfunctional isocyanate;

B is a radical derived from a monohydroxyl-terminated ester of acrylic acid;

y is an integer equal to from 1 to about 12; .

The resins are prepared by reacting a polyfunctional isocyanate and a monohydroxyl-terminated ester of acrylic acid with the condensation product prepared by reacting a polyoxyalkylene bisphenol A with a polycarboxylic acid or anhydride. The resins are useful in coating compositions and particularly useful in coatings which are curable by radiation.

2. Description of the Prior Art

Vinyl ester urethanes are known in the art. See for example Ford, E. C. Jr., et al., U.S. Pat. No. 3,876,726 which discloses vinyl ester urethanes prepared by reacting a polyoxyalkylene bisphenol A with an unsaturated aliphatic dicarboxylic acid and reacting the product thereof with a diisocyanate and a hydroxyl-terminated ester of a methacrylic or an acrylic acid. It has now been discovered that certain vinyl ester urethanes having a specific number of oxyalkylene units and other specific limitations possess a combination of excellent properties in the areas of desirable uncured resin viscosity, and which yield cured coatings possessing such properties in areas as solvent resistance, corrosion resistance in various acidic or alkaline environments, pencil hardness, abrasion resistance, high gloss potential, high pigment loading, adhesion, impact (both direct and reverse) strength, and metal adherence.

SUMMARY OF THE INVENTION

In accordance with the present invention, vinyl ester urethane resins are prepared having the following general formula:

wherein

A is a radical derived from a polyoxyalkylene bisphenol A having the following formula:

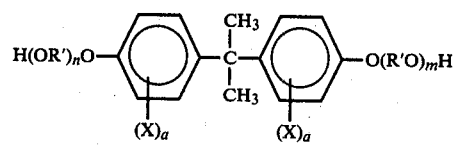

wherein

R' is $C_1$–$C_4$ alkylene group,

X is halogen a is an integer equal to from 0 to 2, and m and n are integers each of which is equal to at least 1 and the sum of which is equal to from about 9 to about 30;

M is a radical derived from (A) an unsaturated aliphatic polycarboxylic acid or an anhydride thereof, (B) a saturated aliphatic polycarboxylic acid or an anhydride thereof, (C) an aromatic polycarboxylic acid or anhydride thereof, or (D) mixtures of A, B, or C;

I is a radical derived from a polyfunctional isocyanate;

B is a radical derived from a monohydroxyl-terminated ester of acrylic acid;

y is an integer equal to from 1 to about 12.

These vinyl ester urethane resins are preferably prepared from a polyoxyalkylene bisphenol A maleate or fumarate hydroxy-terminated polyester oligomer, a polyfunctional isocyanate, and a monohydroxyl-terminated ester of acrylic acid. Each of the components which may be employed in the preparation of the resins of the present invention is described in detail below.

Bisphenol A Hydroxy Terminated Polyester Oligomer (BAHPO)

The bisphenol A component employed in the preparation of the vinyl ester urethane resins of the present invention may be described as a condensate of a polyoxyalkylene bisphenol A and a polycarboxylic acid or anhydride. These materials may be prepared by, first, reacting a bisphenol A with an alkylene oxide and, subsequently, reacting the polyoxyalkylene bisphenol A with the polycarboxylic acid or an anhydride component.

As is well known to those skilled in the art, bisphenol A refers to the following compound.

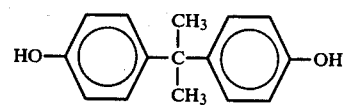

In addition to this material, substituted derivatives of bisphenol A may also be utilized in preparing the resins of the present invention. If substituted derivatives are employed, it is preferred to utilize those having the following general formula:

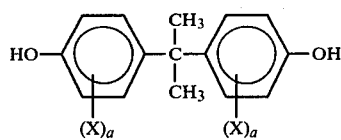

wherein X is selected from the group consisting of chlorine, bromine, and fluorine. Wherein X is halogen and a is an integer equal to 1 or 2. Especially preferred bisphenol A derivatives are those represented by the above general formula wherein X is selected from the group consisting of chlorine, bromine, and fluorine.

The polyoxyalkylene derivatives of the bisphenol A are prepared by reacting the bisphenol A with an alkylene oxide. Suitable alkylene oxides which may be employed include, for example, ethylene oxide and propylene oxide. The preferred polyoxyalkylene derivatives of bisphenol A useful in the present invention may be represented by the following general formula:

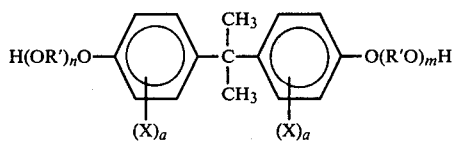

wherein
R' is $C_1$–$C_4$ alkylene group,
X is halogen
a is an integer equal to from 0 to 2, and
m and n are integers each of which is equal to at least 1 and the sum of which is equal to from about 9 to about 30.

The sum of m and n in the above formula is determined by the number of mols of alkylene oxide reacted with each mol of bisphenol A. Thus, in preparing the polyoxyalkylene derivatives of bisphenol A useful in the present invention, at least 9 and no more than about 30 mols of alkylene oxide should be reacted with each mol of bisphenol A. Preferred results are achieved when the number of mols of alkylene oxide utilized—i.e., the sum of m and n in the above formula—is equal to from about 12 to about 20. It has been found that, as the amount of alkylene oxide employed is increased, the properties of the uncured and cured resins change and certain of said properties such as flexibility, metal adherence and fluidity improve. It is necessary to select the amount of alkylene oxide employed to achieve a resin having the desired properties in uncured and cured resins. Especially preferred flexibility properties are achieved with derivatives in which the sum of m and n is equal to about 16.

In the especially preferred polyoxyalkylene bisphenol A derivative, R' in the above formula is an alkylene group containing from 2 to 3 carbon atoms.

The bisphenol A hydroxy terminated polyester oligomer (BAHPO) useful in the preparation of vinyl ester urethane resins in accordance with the present invention are prepared by reacting the polyoxyalkylene bisphenol A derivatives described above with an unsaturated polycarboxylic acid or an anhydride thereof, a saturated aliphatic polycarboxylic acid or an anhydride thereof, an aromatic polycarboxylic acids or an anhydride thereof or mixtures of any of the above. Unsaturated polycarboxylic acids which may be employed in preparing derivatives useful in the present invention include, for example, maleic acid and fumaric acid. Anhydrides which may also be utilized include maleic anhydride. Saturated aliphatic polycarboxylic acids which may be useful include adipic acid or azelaic acid or succinic acid among others. Aromatic polycarboxylic acids which may be useful include orthophthalic acid and terephthalic acid.

The amount of polycarboxylic acid or anhydride employed in the preparation of the BAHPO should be such that the mol ratio of alkoxylated bisphenol A to acid or anhydride is equal to from about 2:1 to about 13:12. If either more than or less than this amount is employed, the resins will not exhibit the improved properties mentioned above and discussed in detail below.

Representative polyoxyalkylene bisphenol A derivatives which may be employed include, for example, polyoxypropylene (9)-bisphenol A, polyoxyethylene (12)-bisphenol A, polyoxypropylene-(9)-tetrabromobisphenol A, polyoxypropylene (16)bisphenol A, and polyoxypropylene (30)-bisphenol A. The numerical notations succeeding the term "polyoxypropylene" refers to the number of oxyalkylene units present.

Isocyanate

In preparing the vinyl ester urethane resins of the present invention, any polyfunctional isocyanate, such as toluene diiocyanate or a polymethylene polyphenylene polyfunctional isocyanate having an average isocyanate functionality of more than two such as those compounds sold under the trade names of Rubinate M polyisocyanate and PAPI 901 polyisocyanate, may be employed. Preferred results are achieved when either of the above-mentioned polyfunctional isocyanates are employed. As is well known to those skilled in the art, toluene diisocyanate is frequently employed as a mixture of the 2,4 and 2,6 isomers. In addition to the above mentioned aromatic isocyanates, aliphatic isocyanates such as isophorone diisocyanate, hexamethylene diisocyanate may also be used particularly if superior color or weathering properties are desired.

In preparing the vinyl ester urethane resins of the present invention care should be taken to avoid using excessive amount of the polyisocyanate to minimize the formation of undesirable by-products.

The ratio of relative amounts of BAHPO, polyfunctional isocyanate and monohydroxy acrylate should preferably satisfy the two following criteria.

For every 2 moles of polyfunctional isocyanate there should be utilized at least one mole of Bisphenol A hydroxy terminated polyester oligomer.

The number of isocyanate equivalents should equal the total number of hydroxy equivalents of BAHPO and monohydroxy acrylate.

For example, if the desired choice for isocyanate is toluene diisocyanate, one should utilize four isocyanate equivalents of toluene diisocyanate, two hydroxy equivalents of BAHPO and two equivalents of a monohydroxy terminated acrylate such as hydroxyethyl acrylate. If the desired choice of isocyanate is 2,4,4',-triisocyanato diphenyl methane there should be used six isocyanate equivalents of the triisocyanate, two hydroxy equivalents of BAHPO and four hydroxy equivalents of acrylate. If a polyfunctional isocyanate such as a polymethylene polyphenyl isocyanate having a NCO functionality of 2.7 is the choice as isocyanate, the ratio should be 5.4 isocyanate equivalents of the isocyanate, two hydroxy equivalents of BAHPO and 3.4 equivalents of acrylate.

Ester of Acrylic Acid

The monohydroxyl-terminated ester of acrylic acid which may be employed in accordance with the present invention may be pentaerythritol triacrylate, glycerol diacrylate, trimethylolpropane diacrylate, neopentyl monoacrylate, or those esters having the following general formula (I):

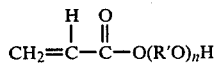

wherein
R' is an alkylene group containing 2 to 5 carbon atoms, and
n is an integer equal to from 1 to about 3.

The materials of formula I maybe prepared by reacting acrylic acid with an alkylene oxide selected from the group consisting of ethylene oxide, butylene oxide, pentylene oxide ad propylene oxide. The reaction is carried out by methods which are well known in the art. The integer n in the above formula is determined by the mols of alkylene oxide employed per mol of acrylic acid. In accordance with the present invention, it has been found that the desired vinyl ester urethane resins are prepared only from materials wherein this number has a value equal to from at least 1 to about 3. Preferred results have been achieved with resins in which this value of n was equal to from 1 to about 2.

Representative materials which may be employed include, for example, hydroxyethyl acrylate, hydroxypropyl acrylate, polyoxyethylene(2)acrylate, polyoxyethylene(3)acrylate, polyoxypropylene(2)acrylate, and polyoxypropylene(3)acrylate.

Pentaerythritol triacrylate, glycerol diacrylate, trimethylolpropane diacrylate or neopentyl glycol monoacrylate may be prepared by esterification or transesterification, techniques well known to those skilled in the art.

The acrylate may be employed either as a single compound or as a mixture of two or more compounds. Preferred results are achieved with hydroxypropyl acrylate and/or hydroxyethyl acrylate.

The vinyl ester urethane resins of the present invention may be prepared by several alternative procedures. For example, they may be prepared by reacting all three components simultaneously, by reacting the isocyanate component with either the BAHPO or the acrylate component (prepolymer technique) or by blending the BAHPO and the acrylate and subsequently thereto adding the isocyanate.

In the one-shot method, all of the components; that is, the BAHPO, the polyfunctional isocyanate, and the monohydroxyl-terminated ester of acrylic acid, are combined and the resulting reaction mixture is heated until substantially all of the isocyanate has been reacted. This point is determined by methods which are well known in the art.

In the prepolymer method the polyfunctional isocyanate is reacted with either the acrylate or the BAHPO. If the isocyanate is reacted with the BAHPO it is preferred to use a diisocyanate.

In a preferred blend technique the BAHPO is blended first with the hydroxyl-terminated ester of acrylic acid and subsequently, thereto the polyfunctional isocyanate is added to the blend. The BAHPO and hydroxyl-terminated ester of acrylic acid blend are first heated to a temperature of about 50° C. The polyfunctional isocyanate is added gradually over a period of about one hour while the reaction temperature is allowed to reach about 70°–100° C.

The urethane reaction is completed while the mixture is maintained for from about 3 to about 6 hours at temperatures of from about 70° C. to about 100° C. As will be apparent to those skilled in the art, the reaction time and temperature are interdependent variables and, as such, may be varied over a wide range. Thus, for example, if the reaction temperature is increased, the time required for completion of the reaction may be decreased.

The blend technique is the preferred method because it allows for better control of the exothermic reaction and minimizes the formation of by-products. This technique also allows for some minor variation of the relative amounts of components without substantially affecting the nature of the resulting vinyl ester urethane. The alternative methods are however quite acceptable although greater care in selecting the amounts of components is desirable.

Regardless of which technique is employed, it is suggested to include in the reaction mixture a polymerization inhibitor such as hydroquinone and, if desired, an antioxidant such as 2,6-ditertiary butyl 4-methyl phenol.

The resins may be prepared as a melt without the use of any solvent or the reaction may be carried out in the presence of a suitable solvent. If a solvent is employed, a vinyl monomer is preferred.

Suitable vinyl monomers which may be employed as a solvent in preparing compositions comprising the vinyl ester urethane resins are well known in the art and include, such reactive solvent as for example, styrene, chlorostyrene, t-butyl styrene, divinyl benzene, vinyl toluene, vinyl acetate, vinyl propionate, acrylic acid esters not used as one of the three components in the resin synthesis, diallyl phthalate, diallyl fumarate, and triallyl cyanurate. Nonreactive solvents useful in compositions include, ketones such as acetone or methylethyl ketone, or aromatic and aliphatic hydrocarbons.

Preferred solvents are acetone, toluene, methylethyl ketone, 2-ethylhexyl acrylate, hexanediol diacrylate, trimethylolpropane triacrylate, N-vinyl-2-pyrrolidone, neopentyl glycol dialcrylate, methyl methacrylate or mixtures thereof.

The resins of the present invention and prepared according to the above mentioned methods may be dissolved in suitable solvents to prepare coating compositions. Such suitable solvents include any of the above solvents enumerated as useful in the synthesis of the resins or may include any of the following additional solvents such as hydroxypropyl acrylate, hydroxyethyl acrylate, hydroxypropyl methacrylate, hydroxyethyl methacrylate, acrylic acid, methacrylic acid, dimethyl acrylamide, acrylamide, pentaerythritol triacrylate acrylonitrile, and other commonly used diluents in the coating art.

The amount of vinyl monomer solvent employed in these compositions can be varied over a wide range depending upon the intended use of the composition. In addition to the vinyl ester urethane resin and monomer, the compositions of the present invention may also include any of those additives which are conventionally employed in the preparation of such compositions. These include, for example, pigments to add color to the cured product; fire-retardant additives; and fillers, such as antimony oxide, silicon oxides, magnesium oxide, magnetic iron oxides, and boron oxides, to alter the physical properties of said products.

These compositions are particularly useful in the preparation of coatings. Suitable substrates which may be coated include metals, wood, paper, polyester films, thermoplastic or thermoset molded parts. Coating such parts particularly by in-mold coating techniques may prove useful in improving the surface characteristics of the parts in the areas of profile blemishes such as sink mold marks and voids. The coatings are particularly amenable to U.V. curing when a U.V. sensitizer is present and may not require an inert ambient atmosphere. Coatings curable by other means require an initiating curing mechanism. Suitable curing mechanisms involve heat, chemical initiators, electron beam radiation, high energy radiation among others.

The vinyl ester urethane resins of the present invention are particularly characterized by their improved properties in coatings and inks especially when compared with the previously available vinyl urethane resins. The resins of the present invention may further exhibit improvements in the areas of increased flexibility, excellent corrosion resistance, and are useful in compositions which are fast curing and utilize U.V. light as catalyst.

An important advantage of the resins of the present invention is the unexpected low viscosity. This lower viscosity allows for easier handling and avoids the need for expensive monomer. The preparation of U.V. curable coatings from the resins exhibit highly flexible properties and minimized blistering.

It has also been found that the properties of the vinyl ester urethane resins of the present invention may be varied depending upon the value of y, oxyalkylene units, and isocyanate functionality in the above-identified formula. Thus, it is possible to prepare a series of resins the properties of which are varied over a considerable range depending upon the ultimate use of the resin.

In order to describe the present invention so that it may be more clearly understood, the following examples are set forth. These examples are given primarily for the purpose of illustration and any enumeration of detail contained therein should not be interpreted as a limitation on the concept of the present invention.

In the examples, the following standard tests, procedures, and components were employed:

Pencil hardness was measured according to the test described in the Paint Testing Manual, Gardner/Sward, fourteenth edition (1972), Chapter 5, paragraph 5.1, 2, and 16.

Measurement of Dry film thickness of organic coatings was determined in accordance with ASTM method D1005.

Elongation of attached organic coatings with cylindrical mandrel apparatus was determined in accordance with ASTM Method D1737.

Elongation of attached organic coatings with conical mandrel apparatus was determined in accordance with ASTM Method D522.

Resistance of organic coatings to the effects of rapid deformation (Impact) was determined in accordance with ASTM Method D2794.

Cure completeness was measured by rubbing the cured materials with a solvent dipped cheesecloth. 300 rubbings without effect indicate a complete cure.

The acid number of the resin refers to the number of milligrams of potassium hydroxide required to neutralize one gram of the resin.

The percent free NCO was determined by titration employing the method described in Union Carbide Bulletin F-41146 entitled "Urethane Coatings Chemicals" at page 24.

The saponification number refers to the number of milligrams of potassium hydroxide required to saponify one gram of the resin.

The hydroxyl number refers to the number of milligrams of potassium hydroxide equivalent to the hydroxyl content of one gram of the resin.

The hydroxyethyl acrylate employed had a purity of 97% by weight.

Examples 1 thru 3 illustrates the preparation of polyoxyalkylene bisphenol A derivatives useful in the preparation of the vinyl ester urethane resins of the present invention.

EXAMPLE 1

Preparation of Polyoxyalkylene Bisphenol A Maleate Diester

Into a two-liter reaction flask equipped with a stirrer, thermometer, nitrogen inlet tube, and distillation head, there were added 1440 grams (2.06 mols) of polyoxypropylene bisphenol A containing an average of 9 mols of propylene oxide per mol of bisphenol A and 101 grams (1.03 mols) of maleic anhydride. The resulting reaction mixture was heated to from 210° C. to 215° C. and held at that temperature for 5 hours. At this time, the acid number had dropped to 14. Vacuum was then applied to the reactiion mixture for 1 hour while maintaining the temperature at from 210° C. to 215° C. The vacuum was removed and 0.77 g. hydroquinone added. The resin was cooled to 140° C. and poured from the reaction flask. After cooling to room temperature, the product, identified as the diester of the polyoxypropylene bisphenol A, was an amber colored semi-solid having an acid number of 11, a saponification number of 76, and a hydroxyl number of 89.

EXAMPLE 2

Preparation of Polyester of Polyoxyalkylene Bisphenol A

Into the reaction flask described in Example 1, there were added 1439 grams (1.46 mols) of polyoxypropylene bisphenol A containing an average of 16 mols of propylene oxide per mol of Bisphenol A and 71.6 grams (0.73 mols) of maleic anhydride. The resulting reaction mixture was reacted as in Example 1. After cooling to room temperature, the resulting product, identified as the polyester derivative of the polyoxypropylene bisphenol A, was an amber-colored soft resin having an acid number of 16, a saponification number of 54 and a hydroxyl number of 66.

EXAMPLE 3

Preparation of Polyester of Polyoxyalkylene Bisphenol A

Into the reaction flask described in Example 1, there were added 1312 grams (0.67 mols) of a polyoxypropylene bisphenol A containing an average of 30 mols of propylene oxide per mol of bisphenol A and 32 grams (0.33 mols) of maleic anhydride. After reacting as in Example 1, the resultant amber liquid resin was identified as a polyester derivative of the polyoxypropylene bisphenol A. The product had an acid number of 8, a saponification number of 28, and a hydroxyl number of 30.

In the following four examples, the vinyl ester urethane resins are prepared in a blend method employing a melt technique.

EXAMPLE 4

Into a two-liter 3 necked reaction flask equipped with a stirrer, thermometer and dry air inlet tube, were added 741 g. (0.5 mol) of the hydroxy terminated polyester oligomer described in Example 1. This intermediate was heated to 52° C. at which time 120 g. (1 mol) of 97% hydroxyethyl acrylate was added. 174 g. (1 mol) of toluene diisocyanate were then added over a period of 30 minutes. At this point, the temperature due to exothermic urethane reaction had risen to 79° C. The reaction mass was stirred at 85°–90° C. for three hours at which point the urethane reaction was complete and the resin poured. Upon cooling there resulted an amber colored semi-solid which had an acid number of 8, a saponification number of 159, a hydroxyl number of 26 and no residual isocyanate.

EXAMPLE 5

In equipment described in Example 4, there was charged 861 g. (0.42 mols) of the hydroxy terminated polyester oligomer described in Example 2. 101 g (0.84 mols) of 97% hydroxy ethyl acrylate was then added while stirring. The temperature was then raised to 50° C. at which point 146 g. (0.84 mols) of toluene diisocyanate were then added over a period of 40 minutes. The temperature due to exothermic urethane reaction rose to 72° C. The mass was then held at 85°–90° C. for three hours at which point the urethane reaction was complete and the resin poured. Upon cooling there resulted an amber colored viscous product which had an acid number of 12, a saponification number of 113, a hydroxyl number of 28 and no residual isocyanate.

EXAMPLE 6

In equipment described in Example 4, there was charged 1004 g. (0.25 mols) of the hydroxy terminated polyester oligomer described in Example 3. 60 g. (0.50 mols) of 97% hydroxyethyl acrylate was then added while stirring. The temperature was then raised to 50° C. at which point 87 g. (0.50 mols) of toluene diisocyanate were then added over a period of 30 minutes. The temperature due to exothermic urethane reaction rose to 64° C. The mass was then held at 85°–90° C. for three hours at which point the urethane reaction was complete and the resin poured. Upon cooling there resulted an amber colored viscous product which had an acid number of 7, a saponification number of 52, a hydroxyl number of 9 and no residual isocyanate.

EXAMPLE 7

In equipment described in Example 4, there was charged 589 g. (0.397 mole) of the hydroxy terminated polyester oligomer described in Example 1. 162 g. (1.35 mols) of 97% hydroxy ethyl acrylate was there added while stirring. The temperature was there raised to 50% at which point 283 g. (0.794 mol) of Rubinate M polyisocyanate was then added over a period of 1 hour. The temperature due to exothermic urethane reaction rose to 88° C. The mass was then held at 85°–90° C. for two hours at which point the urethane reaction was complete and the resin poured. Upon cooling there resulted a dark viscous product which had an acid number of 5, a saponification number of 142, a hydroxyl number of 18 and no residual isocyanate.

Examples 8–14 illustrate some of the properties of the cured resin.

EXAMPLE 8

A 10.1 gram sample of a vinyl ester urethane prepared from the polyester oligomer of polyoxypropylene (9) bisphenol A with maleic anhydride, hydroxyethyl acrylate and Rubinate M by the procedure of Example 7 was dissolved in 10.0 grams of trimethylolpropane triacrylate, 0.63 gram of benzophenone and 0.42 gram of dimethylethanol amine. The lacquer was coated onto a Bonderite treated Parker plate with a wire wound rod to a thickness of about 1 mil. The sample plate was exposed to U.V. illumination in air at a distance of 4 inches from a 200 watt/in Hanovia lamp. The exposure time was about 2 seconds. The cured film displayed the following properties:

Touch was dry, and was not affected by more than 300 methylethyl ketone rubbings; Reverse Gardner Impact test indicated a value of less than 10 inch/lbs, and pencil hardness measurement was F.

EXAMPLE 9

20 grams of a vinyl ester urethane prepared from the polyester oligomer of polyoxypropylene (16) bisphenol A with maleic anhydride, hydroxyethyl acrylate, and Rubinate M by the procedure of Example 7 were dissolved in 10 grams of hexanediol diacrylate. To this solution was added 1.5 grams of a commercially available photosensitizer VICURE-10 (a benzoin ether derivative available from Stauffer Chemical Co.). The resulting solution was a clear light yellow colored pourable liquid. A coating of about 1 mil thickness was applied to a Bonderite treated Parker plate and illuminated with a 200 watt/in Hanovia U.V. lamp at a distance of 4 inches for 2 seconds. The exposure of this coating to the U.V. light resulted in a non-tacky, dry to touch film which displayed exceptional gloss, passed a ⅛" conical mandrel bend test and was not affected by acetone rubbing.

EXAMPLE 10

A 67 gram sample of a polyester urethane prepared from the polyester oligomer of polyoxypropylene (16) bisphenol A with maleic anhydride, hydroxypropyl acrylate and toluene diisocyanate by the procedure of Example 5 was dissolved in 33 grams of 1,6-hexanediol diacrylate, 3 grams of benzophenone and 2 grams of dimethylethanol amine. The lacquer was coated onto a Bonderite treated Parker plate with a #4 wire wound rod. The sample was exposed to U.V. illumination in air at a distance of 4 inches from a 200 watt/in Hanovia lamp. The exposure time was 2 seconds. This resulted in a tack free film which was not affected by methylethyl ketone (MEK) rubbing.

EXAMPLE 11

Two modified bisphenol A compounds were prepared by the addition reaction of 9 moles and 16 moles of propylene oxide respectively to the bisphenol A. These bisphenol A diols were incorporated into acrylate terminated polyester urethane resins by the procedure taught in the previous examples. The bulk viscosity of the resins is listed in Table I. Each resin was dissolved to a concentration of 67 weight percent in the reactive monomer 1,6-hexanediol diacrylate. The room temperature bulk viscosities of the sample solutions were measured with an LVT Brookfield viscometer and are listed in Table I.

A 9 gram sample of each of the above mentioned resin solutions was mixed with 0.5 g. of N-vinyl-2-pyrrolidone and 0.5 grams of VICURE-10 (a benzoin ether photoinitiator available from Stauffer Chemical Co.). Each of the samples containing the photoinitiator was coated onto a Borderite treated Parker test panel to a thickness of about 1 mil by means of a doctor blade applicator. Each panel was exposed to a 100 watt/in Hanovia U.V. Lamp at a distance of 3 inches for 3 seconds in a nitrogen atmosphere. Each coating cured to a tack-free film and displayed the following Reverse Gardner Impact values.

TABLE I

| Avg. no. of propoxyl mols in the oligomer | Bulk Vis. of Resin (CPS) at 25° C. | Vis. of 67% soln. in HDDA (CPS) | Reverse Gardner Impact (inch-lbs) exceeded |
|---|---|---|---|
| 9 | 2,000,000 | 5,800 | 88 |
| 16 | 120,000 | 2,200 | 100 |

*1,6-hexanediol diacrylate

EXAMPLE 12

67 grams each of the vinyl ester urethanes prepared from the polyester oligomer of a polyoxypropylene (9) and (16) bisphenol A with maleic anhydride, hydroxyethyl acrylate and toluene diisocyanate according to Examples 4 and 5 respectively was dissolved in 33 grams of 1,6-hexanediol diacrylate. To these solutions was added 5 grams of VICURE-10 (a benzoin ether derivative from Stauffer Chemical Co.). The resulting solutions were clear light yellow colored lacquers. A sample of each lacquer was coated onto a Bonderite treated Parker plate by means of a #4 wire wound rod. The coated plates were exposed to U.V. illumination in air at a distance of 4 inches from a 200 watt/in. Hanovia U.V. lamp. Both samples cured to a dry to the touch state in less than 1.5 seconds.

EXAMPLE 13

60 parts of resin prepared from the polyester oligomer of polyoxypropylene (9) bisphenol A, maleic anhydride, hydroxyethyl acrylate, and toluene diisocyanate according to the method of Example 4 were dissolved in 40 parts of hexanediol diacrylate. To this solution was added 3 parts of benzophenone and 2 parts of dimethylamino ethanol. The resin solution was cast on a steel Q-Panel with a No. 16 Gardner Wire Wound Rod to a dry film thickness of 1.5 mil. The dry film thickness was measured to insure a uniform coating. The coated panel was placed 4 inches from a 200 watt/inch intensity mercury vapor U.V. light. The total exposure time was 5 sec. which resulted in a satisfactory cure. The guide line used to measure total cure was that the total MEK rubs to remove the cured coating must be greater than 300 cycles. The following properties were measured on this panel and the corresponding results were obtained. A direct impact of 25 inch-pounds, and a reverse impact of 15 inch-pounds were obtained using a Gardner Impact Tester, Model 1G 1120 which employs a 0.625 inch diameter male punch and a 0.640 inch diameter female die. A 9 H pencil hardness was obtained, and the cylindrical Mandrel Test passed a 6.75% elongation.

EXAMPLE 14

60 parts of resin prepared from the polyester oligomer of polyoxypropylene (16) bisphenol A, maleic anhydride, hydroxyethyl acrylate, and toluene diisocyanate according to the method of Example 5 were dissolved in 40 parts of hexanediol diacrylate. To this solution was added 3 parts of benzophenone and 2 parts of dimethylamino ethanol. The resin solution was cast on a steel Q-Panel with a No. 16 Gardner Wire Wound Rod to a dry film thickness of 1.5 mil. The dry film thickness was measured to insure a uniform coating. The coated panel was placed 4 inches from a 200 watt/inch intensity mercury vapor U.V. light. The total exposure time was 5 sec. which resulted in a satisfactory cure. The guide line used to measure total cure was that the total MEK rubs to remove the cured coating must be greater than 300 cycles. The following properties were measured on this panel and the corresponding results were obtained. A direct impact of 80 inch-pounds, and a reverse impact of 20 inch-pounds were obtained using a Gardner Impact Tester, Model 1G 1120 which employs a 0.625 inch diameter male punch and a 0.640 inch diameter female die. A pencil hardness of F was obtained, and the cylindrical mandrel Test passed a 6.75% elongation.

What is claimed is:

1. A vinyl ester urethane resin having the following formula:

wherein
A is a radical derived from a polyoxyalkylene bisphenol A having the following formula:

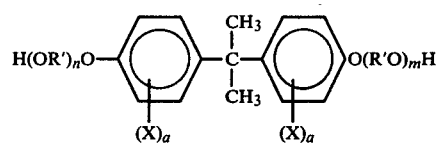

wherein
R' is $C_1$–$C_4$ alkylene group,
X is halogen
a is an integer equal to from 0 to 2, and
m and n are integers each of which is equal to at least 1 and the sum of which is equal to from about 9 to about 30;
M is a radical derived from (A) an unsaturated aliphatic polycarboxylic acid or an anhydride thereof, (B) a saturated aliphatic polycarboxylic acid or an anhydride thereof; (C) an aromatic polycarboxylic acid or anhydride thereof, or (D) mixtures of A, B, and C;
I is a radical derived from a polyfunctional isocyanate;
B is a radical derived from a monohydroxyl-terminated ester of acrylic acid;
y is an integer equal to from 1 to about 12.

2. A vinyl ester urethane resin as claimed in claim 1 wherein the bisphenol A has the following formula:

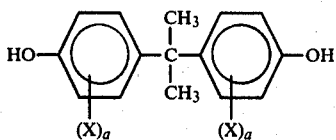

wherein
X is halogen, and
a is an integer equal to 1 or 2.

3. A vinyl ester urethane resin as claimed in claim 2 wherein X is selected from the group consisting of bromine, chlorine, and fluorine.

4. A vinyl ester urethane resin as claimed in claim 1 wherein the sum of m and n is equal to from about 12 to about 20.

5. A vinyl ester urethane resin as claimed in claim 1 wherein the polycarboxyic acid or anhydride thereof is selected from the group consisting of fumaric acid, maleic acid, and maleic anhydride.

6. A vinyl ester urethane resin as claimed in claim 1 wherein y is equal to about 1 to 5.

7. A vinyl ester urethane resin as claimed in claim 1 wherein the polyfunctional isocyanate is selected from the group consisting of toluene diisocyanate, and polymethylene polyphenylene polyfunctional isocyanate having an average isocyanate functionality of more than two.

8. A vinyl ester urethane resin as claimed in claim 7 wherein the polyfunctional isocyanate is an aliphatic diisocyanate.

9. A vinyl ester urethane resin as claimed in claim 1 wherein the hydroxyl-terminated ester of acrylic acid has the following formula:

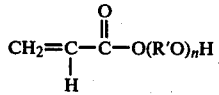

wherein
R' is an alkylene group containing 2 to 5 carbon atoms, and
n is an integer equal to from 1 to about 3.

10. A vinyl ester urethane resin as claimed in claim 9 wherein n is equal to from 1 to about 2.

11. A vinyl ester urethane resin as claimed in claim 1 wherein the hydroxyl-terminated ester is hydroxypropyl acrylate, hydroxy ethyl acrylate or mixtures thereof.

12. A method of preparing a vinyl ester urethane resin, said method comprising;
(a) preparing a bisphenol A hydroxy terminated polyester oligomer by reacting a polyoxyalkylene bisphenol A having the following formula:

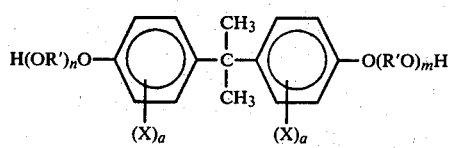

wherein
R' is C$_1$–C$_4$ alkylene group,
X is halogen,
a is an integer equal to from 0 to 2, and m and n are integers each of which is equal to at least 1 and the sum of which is equal to from about 9 to about 30; with an (A) unsaturated aliphatic polycarboxylic acid or an anhydride thereof, (B) saturated aliphatic polycarboxylic acid or an anhydride thereof, (C) an aromatic polycarboxylic acid or anhydride thereof or (D) a mixture of A, B or C in a mole ratio of polyoxy alkylene bisphenol A to polycarboxylic acid or anhydride equal to from about 2:1 to about 13:12 and (b) combining the bisphenol A hydroxy terminated polyester oligomer with a polyfunctional isocyanate and a monohydroxyl-terminated ester of acrylic acid.

13. A method as claimed in claim 12 wherein R' is C$_1$–C$_4$ alkylene group containing from 2 to 3 carbon atoms.

14. A method as claimed in claim 12 wherein X is selected from the group consisting of bromine, chlorine, and fluorine.

15. A method as claimed in claim 12 wherein the sum of m and n is equal to from about 12 to about 20.

16. A method as claimed in claim 12 wherein the polycarboxylic acid or anhydride thereof is selected from the group consisting of fumaric acid, maleic acid, and maleic anhydride.

17. A method as claimed in claim 16 wherein the polycarboxylic acid or anhydride thereof is maleic anhydride.

18. A method as claimed in claim 12 wherein the molar ratio of polyoxyalkylene bisphenol A to acid or anhydride is equal to from about 2:1 to about 13:12.

19. A method as claimed in claim 12 wherein the polyfunctional isocyanate is selected from the group consisting of toluene diisocyanate and polymethylene polyphenylene polyfunctional isocyanate having an average isocyanate functionality of more than two.

20. A method as claimed in claim 19 wherein the polyfunctional isocyanate is an aliphatic diisocyanate.

21. A method as claimed in claim 12 wherein the amount of polyfunctional isocyanate is equal to at least 2 mol per mol of bisphenol A hydroxy terminated polyester oligomer.

22. A method as claimed in claim 12 wherein the hydroxyl-terminated ester of acrylic has the following formula:

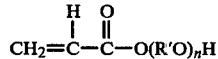

wherein
R' is an alkylene group containing 2 to 5 carbon atoms, and
n is an integer equal to from 1 to about 3.

23. A method as claimed in claim 22 wherein n is equal to from 1 to about 2.

24. A method as claimed in claim 12 wherein the monohydroxyl-terminated ester is hydroxypropyl acrylate, hydroxy ethyl acrylate or mixtures thereof.

25. A method as claimed in claim 12 wherein the bisphenol A hydroxyl-terminated polyester oligomer is reacted with the polyfunctional isocyanate and the hydroxyl-terminated ester of acrylic acid in the presence of a solvent.

26. A method as claimed in claim 12 wherein the hydroxyl-terminated ester of acrylic acid is blended with the bisphenol A hydroxyl-terminated polyester oligomer and the blend is then reacted with the polyfunctional isocyanate.

27. A curable coating composition comprising
(a) a vinyl ester urethane resin having the following formula:

wherein
A is a radical derived from a polyoxyalkylene bisphenol A having the following formula:

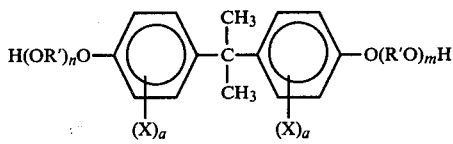

wherein
R' is a $C_1$–$C_4$ alkylene group,
X is halogen,
a is an integer equal to from 0 to 2, and
m and n are integers each of which is equal to at least 1 and the sum of which is equal to from about 9 to about 30;
M is the residue of (A) an unsaturated aliphatic polycarboxylic acid or anhydride thereof, (B) a saturated aliphatic polycarboxylic acid or an anhydride thereof, (C) an aromatic polycarboxylic acid or anhydride thereof, or (D) mixtures of A, B, or C;
I is the residue of a polyfunctional isocyanate,
B is the residue of a monohydroxyl-terminated ester of acrylic acid;
y is an integer equal to from 1 to about 12 and
(b) a chemical initiator.

28. A radiation curable coating composition comprising
(a) a vinyl ester urethane resin having the following formula:

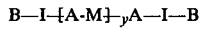

wherein
A is a radical derived from a polyoxyalkylene bisphenol A having the following formula:

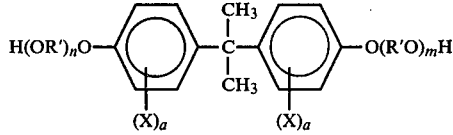

wherein
R' is a $C_1$–$C_4$ alkylene group,
X is halogen,
a is an integer equal to from 0 to 2, and
m and n are integers each of which is equal to at least 1 and the sum of which is equal to from about 9 to about 30;
M is the residue of (A) an unsaturated aliphatic polycarboxylic acid or anhydride thereof, (B) a saturated aliphatic polycarboxylic acid or an anhydride there, (C) an aromatic polycarboxylic acid or anhydride thereof or (D) mixtures of A, B or C;
I is the residue of a polyfunctional isocyanate,
B is the residue of a monohydroxyl-terminated ester of acrylic acid:
y is an integer equal to from 1 to about 12 and
(b) a U.V. sensitizer.

29. A heat curable coating composition comprising
(a) a vinyl ester urethane resin having the following formula:

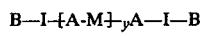

wherein
A is a radical derived from a polyoxyalkylene bisphenol A having the following formula:

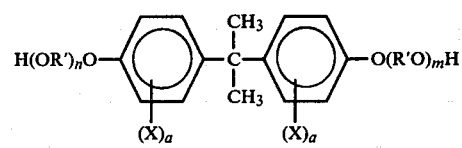

wherein
R' is a $C_1$–$C_4$ alkylene group,
X is halogen,
a is an integer equal to from 0 to 2, and
m and n are integers each of which is equal to at least 1 and the sum of which is equal to from about 9 to about 30;
M is the residue of (A) an unsaturated aliphatic polycarboxylic acid or anhydride thereof, (B) a saturated aliphatic polycarboxylic acid or an anhydride thereof, (C) an aromatic polycarboxylic acid or anhydride thereof or (D) mixtures of A, B or C;
I is the residue of a polyfunctional isocyanate,
B is the residue ot a monohydroxyl-terminated ester of acrylic acid;
y is an integer equal to from 1 to about 12, and
(b) a peroxide or azo initiator.

30. A curable coating composition as claimed in claim 27 which includes a solvent selected from the class consisting of ethylhexyl acrylate, hexanediol diacrylate, trimethylol propane triacrylate, neopentylglycol diacrylate, methyl methacrylate and mixtures of at least two members of the class.

31. A curable coating composition as claimed in claim 28 which includes a solvent selected from the class consisting of ethylhexyl acrylate, hexanediol diacrylate, trimethylol propane triacrylate, neopentylglycol diacrylate, methyl methacrylate and mixtures of at least two members of the class.

32. A curable coating composition as claimed in claim 29 which includes a solvent selected from the class consisting of ethylhexyl acrylate, hexanediol diacrylate, trimethylol propane triacrylate, neopentylglycol diacrylate, methyl methacrylate and mixtures of at least two members of the class.

* * * * *